United States Patent [19]

Lacabanne

[11] Patent Number: 5,224,667
[45] Date of Patent: Jul. 6, 1993

[54] SYSTEM ENABLING THE FLUTTER BEHAVIOR OF AN AIRCRAFT TO BE IMPROVED

[75] Inventor: Michel Lacabanne, Saint-Orens, France

[73] Assignee: Societe Nationale Industrielle et Aerospatiale, Paris, France

[21] Appl. No.: 827,612

[22] Filed: Jan. 29, 1992

[30] Foreign Application Priority Data

Jan. 29, 1991 [FR] France ............................... 91 00975

[51] Int. Cl.⁵ .......................................... B64C 19/00
[52] U.S. Cl. ................................ 244/75 A; 244/194; 364/434
[58] Field of Search ............... 244/76 R, 76 C, 75 A, 244/191, 193, 194, 184, 175, 177; 364/434

[56] References Cited

U.S. PATENT DOCUMENTS

| | | | |
|---|---|---|---|
| 2,832,551 | 4/1958 | Gille | 244/76 C |
| 2,985,409 | 5/1961 | Atwood et al. | 244/76 C |
| 3,279,725 | 10/1966 | Andrew et al. | 244/76 C |
| 3,347,498 | 10/1967 | Priestley et al. | 244/191 |
| 3,374,966 | 3/1968 | Howard | 244/76 C |
| 3,412,961 | 11/1968 | Howard | 244/76 C |
| 3,902,686 | 9/1975 | Wykes et al. | 244/77 |
| 3,903,686 | 9/1975 | Burki | 58/74 |
| 4,697,768 | 10/1987 | Klein | 244/191 |
| 4,706,902 | 11/1987 | Destuynder et al. | 244/76 |

FOREIGN PATENT DOCUMENTS

| | | |
|---|---|---|
| 0101384 | 8/1983 | European Pat. Off. . |
| 0293018 | 11/1988 | European Pat. Off. . |
| 2298132 | 8/1976 | France . |
| 1533011 | 11/1978 | United Kingdom . |
| 87-02964 | 5/1987 | World Int. Prop. O. . |

OTHER PUBLICATIONS

Cohen et al., Advisory Group for Aerospace Research and Development (AGARD), No. 157, Paris, (Oct. 17, 1974), pp. 2301–2317.
Wie et al., Journal of Guidance and Control and Dynamics, vol. 12, No. 2, New York, (Mar. 1989), pp. 147 to 154.

Primary Examiner—Galen Barefoot
Attorney, Agent, or Firm—Fisher, Christen & Sabol

[57] ABSTRACT

A system for improving the flutter behavior of an aircraft provided with a rudder, said system comprising an accelerometer disposed in the rear portion of said aircraft, filter means, and means for adding a correction signal to the piloting signal. According to the invention said filter means comprise a bandpass filter, a phase matching filter, a variable gain amplifier and a switch transmitting the amplified signal to said adder means whenever the air speed of the aircraft is greater than a first speed threshold, said phase matching filter being such that after passing through the control means for the rudder said signal as amplified by said amplifier is retarded by 90° relative to said signal generated by said accelerometer.

11 Claims, 4 Drawing Sheets

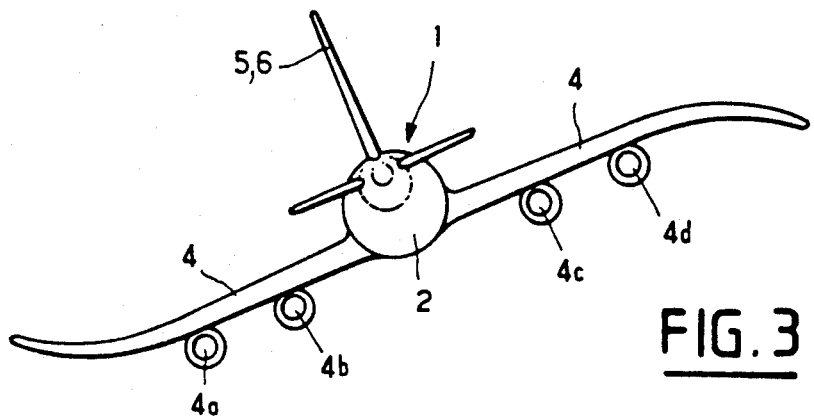
FIG.3
FIG.7
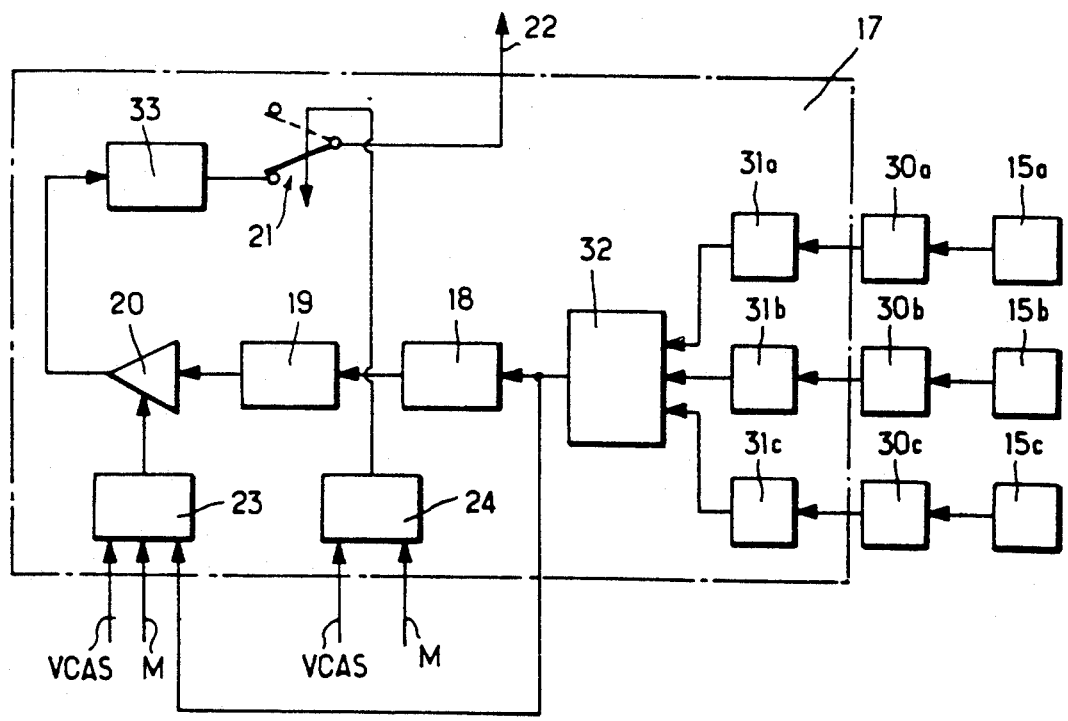

SYSTEM ENABLING THE FLUTTER BEHAVIOR OF AN AIRCRAFT TO BE IMPROVED

The present invention relates to a system enabling the flutter behavior of an aircraft to be improved.

BACKGROUND OF THE INVENTION

Flutter is the appearance of dynamic instability in an aircraft beyond a certain speed, called the flutter critical speed. The phenomenon of flutter is related to coupling between the resonant deformation modes of the aircraft structure (resonant frequencies) and the unsteady aerodynamic forces generated by the movements of the structure. The unstable aeroelastic vibrations that constitute flutter are always uncomfortable for passengers in the aircraft and they may lead to partial or total destruction of the aircraft.

To counter flutter, aircraft manufacturers generally make use of passive means, which consists essentially in modifying the geometry or the stiffness of the aircraft structure, or else the masses carried by the aircraft, e.g. the fuel masses. Aircraft manufacturers can also implement active means, constituted by a system including accelerometers that detect the deformation modes of the aircraft and which control the aerodynamic control surfaces of the aircraft via a logic circuit based on filters in such a manner as to cause said control surfaces to generate forces that counter the effects of flutter. Such a system is described, for example, in U.S. Pat. No. 3,902,686 or in Document WO-87/02964.

Naturally, the detecting accelerometers are disposed on those portions of the aircraft that are most sensitive to the mode of deformation that is to be controlled. For example, it is known that in long-haul civil aircraft and in particular in four-engined jet aircraft, it is the rear portion of the fuselage that oscillates (lateral bending of the rear fuselage) under the effect of turbulence: thus, under such circumstances, the said accelerometers are disposed in the rear portion of the aircraft, as described in the report of Conference No. 157 of the Advisory Group for Aerospace Research and Development (AGARD), held Oct. 14 to 17, 1974 in Paris on the theme "Impact of active control technology on airplane design" by Gerald C. Cohen and Richard L. Schoenman.

In addition, the aerodynamic control surfaces for generating forces that counter aeroelastic vibration may either be provided specially on the aircraft as is described in above-mentioned U.S. Pat. No. 3,903,686, or else they may be constituted by the usual control surfaces of the aircraft. Thus, in the report of above-mentioned AGARD Conference No. 157, the rudder is used to oppose lateral accelerations.

In addition, such active means naturally take account of the speed of the aircraft, as shown in the above-mentioned AGARD document, and also in French patent FR-A-2 298 132.

An object of the present invention is to provide a system of the type described in the report of the above-mentioned AGARD Conference for improving the flutter behavior of an aircraft, in particular in the event of aeroelastic coupling between lateral bending of the rear fuselage and the first antisymmetrical bending mode of the wing unit, and to ensure satisfactory aeroelastic stability under said circumstances.

SUMMARY OF THE INVENTION

To this end, the present invention provides a system for improving the flutter behavior of an aircraft provided with a fixed wing unit and with a rudder which is actuated by control means receiving a yaw piloting signal, said system comprising:

an accelerometer disposed in the rear portion of said aircraft to detect accelerations due to alternating lateral bending thereof and to generate a signal representative of said lateral accelerations;

filter means receiving said signal representative of said lateral accelerations and generating a control correction signal for said rudder, which correction signal depends on the speed of said aircraft and is intended to damp said alternating lateral bending; and adder means for adding said correction signal to said piloting signal;

the system being remarkable in that said filter means comprise:

a bandpass filter whose passband is centered about the frequency of alternating lateral bending of said rear portion and which receives said signal representative of said lateral accelerations as generated by said accelerometer;

a phase matching filter which receives the signal from said bandpass filter;

a variable gain amplifier amplifying the signal from said phase matching filter, the gain of said amplifier being a decreasing function of the air speed of said aircraft; and a switch transmitting the signal amplified by said amplifier to said adder means whenever said air speed of the aircraft is greater than a first threshold speed at which there is a danger of aeroelastic coupling occurring between said alternating bending of said rear portion of said aircraft and the first antisymmetrical bending mode of the aircraft wing unit;

said phase matching filter being such that after passing through said control means for said rudder, said signal amplified by said amplifier is retarded by 90° relative to said signal representative of said lateral accelerations as generated by said accelerometer.

It can be seen that the action of the rudder is particularly effective since it takes place in phase quadrature relative to the alternating lateral bending of the rear portion of the fuselage.

The transfer function of said phase matching filter may be the type $(1+c1 \cdot p)/(1+c2 \cdot p)$, where p is the variable of the Laplace transform and c1 and c2 are constants. Naturally, the values of the constants c1 and c2 depend on the physical characteristics of the aircraft and must be determined for each particular aircraft.

In addition, the transfer function of said bandpass filter may be of the following type:

$$\frac{a0 + a1 \cdot p + a2 \cdot p^2 + a3 \cdot p^3 + \ldots + an-1 \cdot p^{n-1}}{b0 + b1 \cdot p + b2 \cdot p^2 + b3 \cdot p^3 + \ldots + bn \cdot p^n}$$

where p is the variable of the Laplace transform and where $a0, a1, \ldots, an-1, b0, b1, \ldots, bn$ are constants. However, the above transfer function may often be simplified by selecting $a0=0$, $b0=1$, $a2=a3=\ldots=an-1=0$, and $b3=b4=\ldots=bn=0$, with $a1=b1$, and $b2=a1^2$, thereby reducing it to $a1 \cdot p/(1+a1 \cdot p+a1^2 \cdot p^2)$. Here again, the values of the constants depend on the physical characteristics of the aircraft.

Clearly the phase difference between the signal delivered by the accelerometer and the swivelling of the rudder depends not only on the phase matching filter, but also on the bandpass filter and on the dynamic characteristics of the steering control. Thus, to obtain a phase difference of $-90°$, it is necessary for the constants of these two filters to be chosen taking account of the entire system between the accelerometer and the rudder. For example, for a four-engined jet aircraft, the following values may be selected: $c1=0.11$, $c2=0.037$, and $a1=0.0637$.

In order to fine-tune the damping function of the system of the present invention, the gain of said amplifier is a decreasing function not only of said air speed, but also of the Mach number and of the lateral acceleration of the rear fuselage of said aircraft.

Advantageously, and likewise for the purposes of optimizing the operation of the system of the invention, said switch transmits the signal amplified by said amplifier to said adder means when both said air speed and the Mach number of the aircraft are greater respectively than said first threshold speed and a Mach number second threshold speed at which there is a danger of aeroelastic coupling occurring between said alternating bending of said rear portion of said aircraft and the first antisymmetrical bending mode of its wing unit.

The system of the present invention may be of the digital type and, apart from the accelerometer, it may be incorporated in the aircraft's system of flight-control computers.

Since the accelerometer is of the analog type, it is advantageous to provide an anti-aliasing filter between said accelerometer and said bandpass filter, with an analog-to-digital converter then being disposed between said anti-aliasing filter and said bandpass filter.

Advantageously, the transfer function of the anti-aliasing filter is of type $d0/(d0+d1 \cdot p+p^2)$. For the above-mentioned example of a four-engined jet aircraft, $d0$ and $d1$ may be selected to be equal to 3948 and to 89, respectively.

For safety purposes, the system may include a plurality of accelerometers in parallel, disposed close to one another in said rear portion of the aircraft and each generating a signal representative of said lateral accelerations, said signals from said accelerometers being applied to a voting circuit whose output is connected to said bandpass filter. For example, said accelerometers may be disposed one above the other on a fuselage frame member.

In addition, in order to limit the action of the system of the invention relative to the yaw control signal, it is advantageous to provide a saturation device to limit the amplified signal from said variable gain amplifier. The saturation device may be such that the maximum swivel amplitude of the rudder engendered by the system of the invention is equal to 2.5°.

BRIEF DESCRIPTION OF THE DRAWINGS

Embodiments of the invention are described by way of example with reference to the accompanying drawings, in which:

FIG. 3 shows the first antisymmetrical bending mode of the wing unit that may occur while the airplane of FIG. 1 is in flight.

FIG. 7 shows a variant embodiment of the system of the present invention.

DETAILED DESCRIPTION

Figure 1:
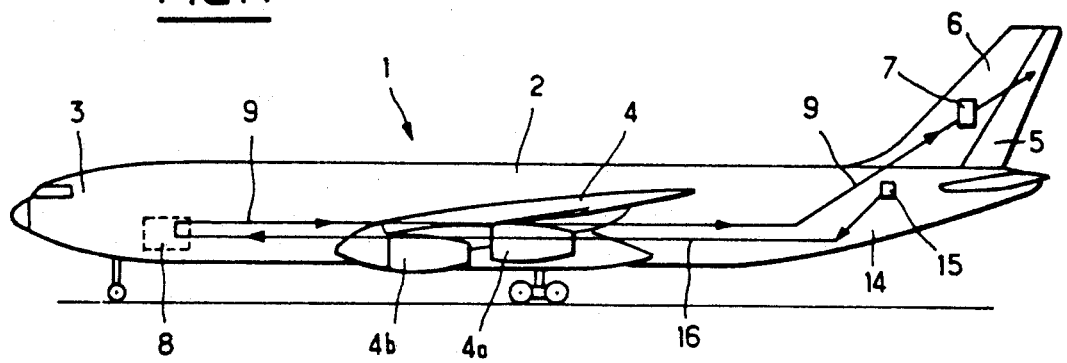
FIG. 1 is a diagram of a long-haul four-engined jet airplane fitted with the system of the present invention.

The airplane shown diagrammatically in FIG. 1 is a long-haul four-engined jet comprising, inter alia, a fuselage 2, having a cockpit 3 at its leading end, fixed wings 4 supporting the four jets $4a$ to $4d$ (see also FIG. 3), and a rudder 5 hinged to a vertical tail plane 6. The rudder 5 is actuated by yaw control means 7, e.g. of the type comprising servo-motors and servo-controls.

The airplane is piloted via at least one flight control computer 8, e.g. disposed in its hold behind the cockpit 3. The flight control computer 8 is connected to the yaw control means 7 by a link 9.

Figure 2:
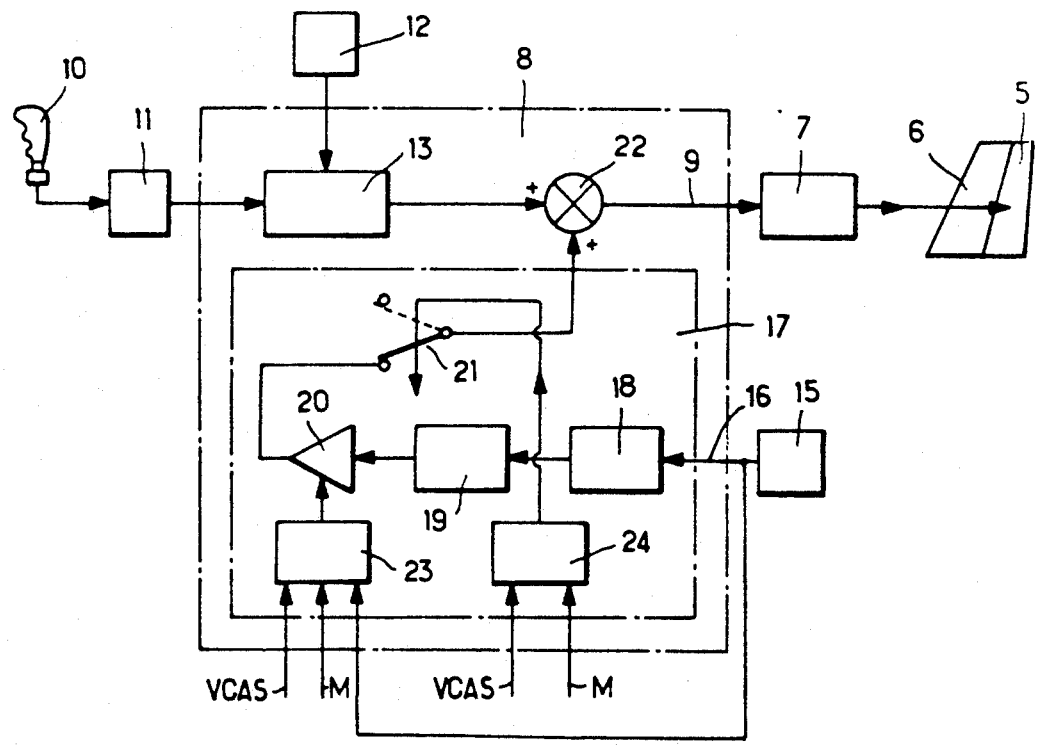
FIG. 2 is a block diagram of the system of the present invention.

As shown in the block diagram of FIG. 2, the flight control computer 8 receives yaw control commands either from a manual control member 10, e.g. of the mini-joystick type, and located in the cockpit for use by the pilot and associated with a transducer 11 that delivers an electrical signal representative of tilting of said member 10, or else from the autopilot 12 of the airplane. A device 13 responds to commands received from the transducer 11 or from the autopilot 12 to generate yaw control commands that are applied to the control means 7 via the link 9.

In known manner, while the airplane 1 is in flight, its rear portion 14 is subjected to alternating lateral bending movements at low frequency (a few Hz). In addition, its wings 4 are subjected to low frequency bending movements, in particular in a mode referred to as the "first antisymmetrical bending mode of the wing unit", in which one wing 4 bends alternately downwards and upwards while the other wing 4 bends alternately upwards and downwards. This first antisymmetrical bending mode is shown in FIG. 3 as seen from behind.

Above a certain air speed of the airplane 1, coupling may occur by means of aeroelastic vibrations between the alternating lateral bending of the rear portion 14 of the fuselage 2 and the antisymmetrical alternating bending of the wings 4. This may give rise to partial or complete destruction of the airplane.

As explained above, the object of the present invention is precisely to avoid such coupling.

To do this, at least one accelerometer 15 is provided in the rear portion 14 of the fuselage 2 to measure the lateral accelerations of said rear portion of the fuselage 2 and to apply a signal representative of said lateral accelerations to the flight control computer 8 via a link 16.

In accordance with the present invention, the flight control computer 8 further includes a filter assembly 17 comprising a bandpass filter 18, a phase matching filter 19, an amplifier 20, and a switch 21. In addition, an adder 22 is placed on the link 9 between the device 13 for generating the yaw command and the servo-control 7. It serves to add together the signal from the filter assembly 17 and the signal from the device 13 and to convey the sum of said signals to the control means 7.

The bandpass filter 18 serves to delimit the range of frequencies monitored and it eliminates structural frequencies that are not centered around the frequency under surveillance. For example, if the bending frequency of the rear portion 14 of the fuselage at which there is a danger of aeroelastic coupling occuring with the first antisymmetrical bending mode of the wing unit is equal to 2.5 Hz, then the bandpass filter 18 is designed to pass the band of frequencies from 1 Hz to 4 Hz. Using p in conventional manner to designate the variable of the Laplace transform, the transfer function of the filter 18 may be of the type:

$$\frac{a0 + a1 \cdot p + a2 \cdot p^2 + a3 \cdot p^3 + \ldots + an - 1 \cdot p^{n-1}}{b0 + b1 \cdot p + b2 \cdot p^2 + b3 \cdot p^3 + \ldots + bn \cdot p^n}$$

where $a0, a1, \ldots, an-1$, and $b0, b1, b2, b3, \ldots, bn$ are constants.

In a particular embodiment applied to a four-engined jet, the transfer function of the bandpass filter 18 is selected to be equal to:

$$a \cdot p/(1 + b1 \cdot p + b2 \cdot p^2)$$

in which case:

$$a0=0, b0=1, a2=a3=\ldots=an-1=0 \text{ and } b3=b4=\ldots=bn=0$$

In addition, the following values are selected:

$$a1=b1=0.0637 \text{ and } b2=0.0637^2=0.00406$$

The phase matching filter 19 may have a transfer function of the type $(1+c1 \cdot p)/(1+c2 \cdot p)$. In the practical example mentioned above, c1 and c2 are respectively selected to be equal to 0.11 and to 0.037.

The amplifier 20 is of the variable gain type. The gain of said amplifier 20 is controlled by a calculator device 23. The calculator device 23 receives signals respectively representative of the conventional air speed VCAS, the Mach number M, and the lateral acceleration of the rear fuselage of the airplane 1. The first two of these signals are delivered by sensors or calculators conventionally mounted on board the airplane 1 and not shown. The third signal comes from the accelerometer 15. The calculation device 23 causes gain of the amplifier 20 to decrease as a function of the air speed VCAS, of the Mach number M, and of the lateral acceleration of the rear fuselage. It may be observed that the gain of the amplifier 20 takes account of the altitude of the airplane 1 via the Mach number M.

The switch 21 is controlled by a comparator device 24 which receives the air speed VCAS and the Mach number M from said sensors or calculators respectively. If the air speed VCAS and the Mach number M are greater than respective thresholds at which aerelastic coupling between the lateral bending of the rear of the fuselage and antisymmetrical bending of the wing unit may occur, then the comparator device 24 causes the switch 21 to take up its position in which it connects the output from the amplifier 20 to the adder 22. In contrast, so long as the air speed VCAS and the Mach number M remain below said thresholds, the comparator device 24 causes said switch 21 to take up its position in which it isolates the output of the amplifier 20 from the adder 22.

Thus, the lateral acceleration signal measured by the accelerometer 15, filtered by the filters 18 and 19, and amplified by the amplifier 20 forms a correction signal which is superposed on the yaw control signal coming from the device 13 whenever the switch 21 is in the appropriate position. This correction signal controls the rudder 5 via the control means 7 to counter the lateral bending of the rear portion 14 of the fuselage 2.

According to an important feature of the present invention, the transfer function of the phase matching filter 19 is selected as a function of the transfer function of the bandpass filter 19 and of the transfer function of the control means 7 so that the swivelling applied to the rudder 5 by the output from said control means 7 is phase shifted by $-90°$ relative to the acceleration signal measured by the accelerometer 15 at the bending mode frequency of the fuselage. Because of this feature, the swivelling of the rudder 5 is particularly effective at damping the alternating lateral bending of the rear portion of the fuselage since it is retarded by 90° at the frequency of said alternating lateral bending relative to the measured acceleration.

Figure 4:
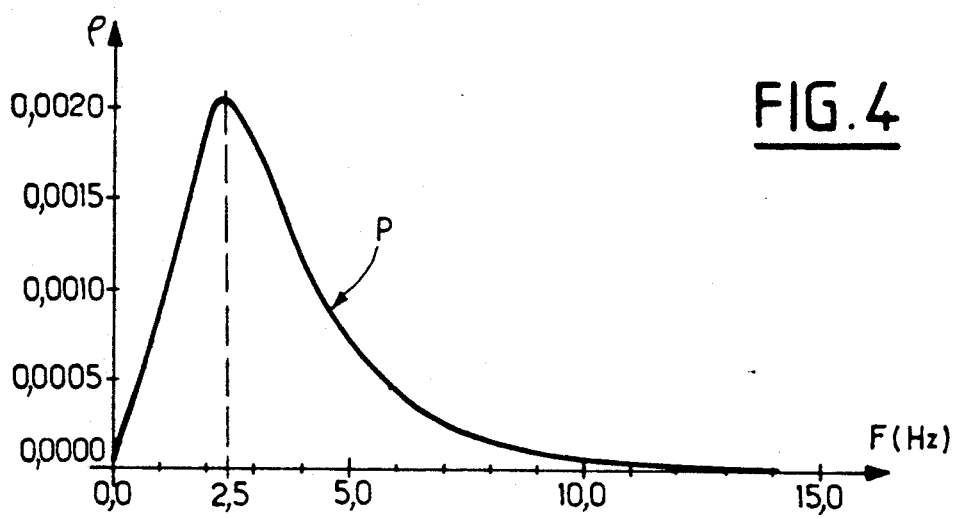
FIGS. 4 and 5 are graphs showing the transfer function of the system of the present invention.
Figure 5:
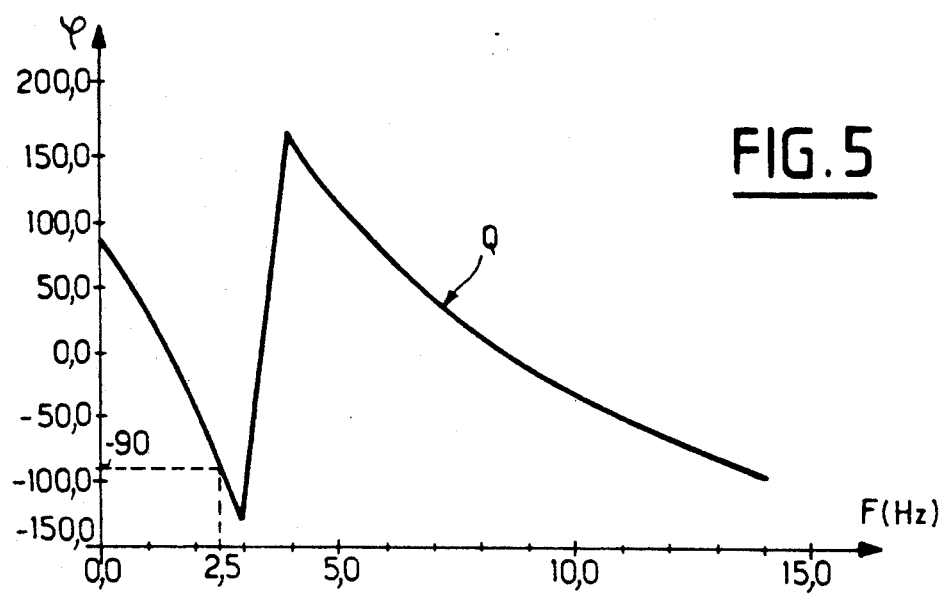

FIGS. 4 and 5 are graphs showing respectively the modulus $\rho$ and the phase $\phi$ of the overall transfer function of the filters 18 and 19, of the amplifier 20, and of the control means 7 as a function of frequency F (in Hz). It can be seen that the modulus $\rho$ is at a maximum at the frequency (2.5 Hz) of the lateral bending mode of the rear fuselage and that, at said frequency, said phase $\phi$ is equal to $-90°$, i.e. the phase difference between the measurement signal from the accelerometer 15 and the swivelling of the rudder 5 is $-90°$.

Figure 6:
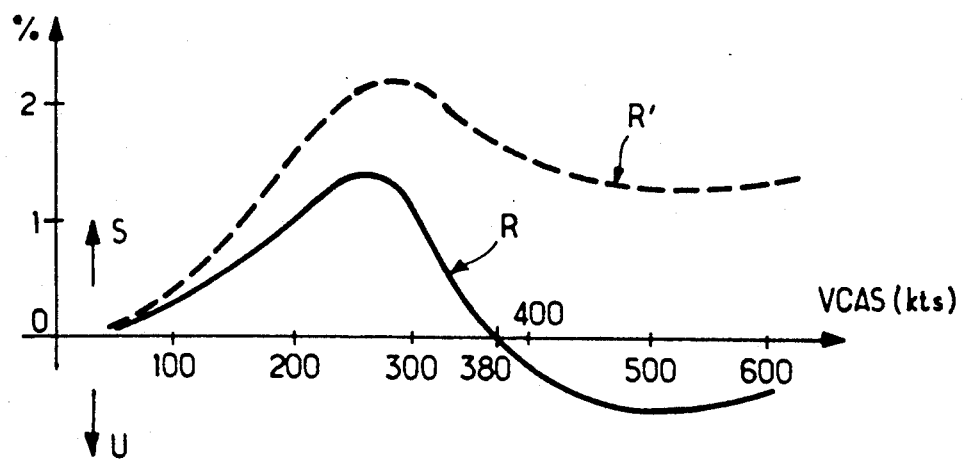
FIG. 6 is a graph showing the effect of the system of the present invention on the stability of the airplane shown in FIGS. 1 and 3.

In addition, FIG. 6 is a graph showing damping of the lateral bending mode of the rear fuselage (as a percentage of critical damping, i.e. the damping at which return to the equilibrium position is aperiodic) as a function of the air speed VCAS (in kts). It can be seen (curve R) that without the filter system 17 of the invention, the lateral bending of the rear fuselage passes from a stable region (S) to an unstable region (U) beyond the critical flutter speed, whereas with the filter system 17 of the invention (curve R'), the lateral bending of the rear fuselage remains in the stable region (S) at all speeds. Thus, the system of the invention causes the flutter critical speed to disappear and it increases the damping of the lateral bending mode of the rear fuselage throughout the range of speeds under consideration.

In the embodiment shown in FIG. 2, it is assumed that there is only one accelerometer 15. In contrast, the variant embodiment shown in FIG. 7 is provided with three analog type accelerometers 15a, 15b, and 15c, for safety reasons. The measurement signals from said accelerometers are transmitted via respective anti-aliasing filters 30a, 30b, and 30c, to analog-to-digital converters 31a, 31b, and 31c. Thereafter, said signals are applied to a voting circuit 32 whose output is connected to the bandpass filter 18. The voting circuit 32 provides the filter 18 and the calculator 23 either with the signal that is the most probable, i.e. the signal which lies between the other two, or else with a combination of the signals coming from the accelerometers 15a, 15b, and 15c.

In addition, in the variant embodiment of FIG. 7, a saturation device 33 is placed between the amplifier 20 and the switch 21. For example, the saturation device 33 may limit the yaw control correction command generated on the basis of the accelerators 15a, 15b, and 15c via the filters 18 and 19 to no more than 2.5°.

As shown in FIG. 7, the analog-to-digital converters 31a, 31b, and 31c, the voting circuit 32, and the saturation device 33 may be included in the filter assembly 17.

Figure 9:
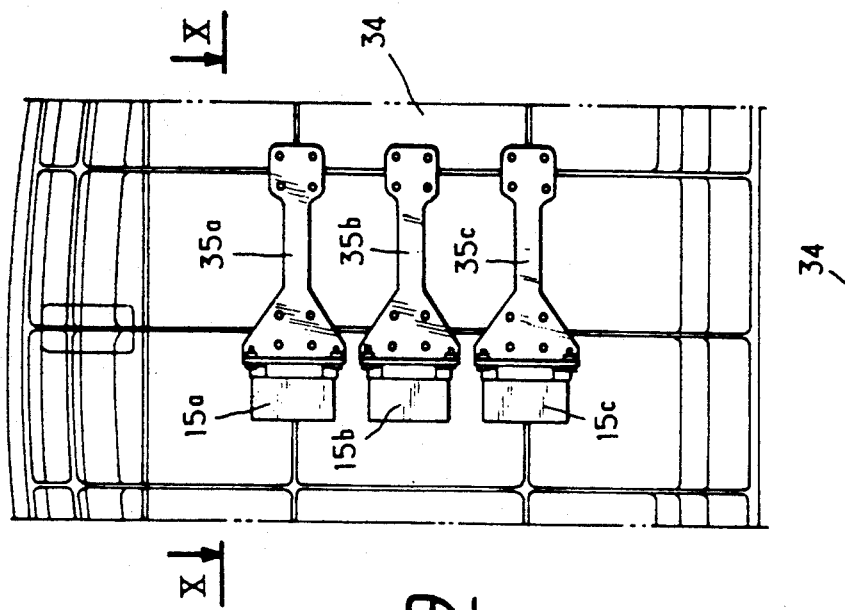
FIG. 9 is a view as seen on arrow IX of FIG. 8.
Figure 10:
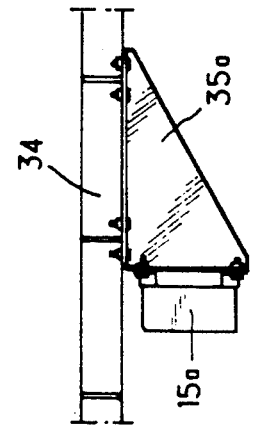
FIG. 10 is a section view on line X—X of FIG. 9.
Figure 8:
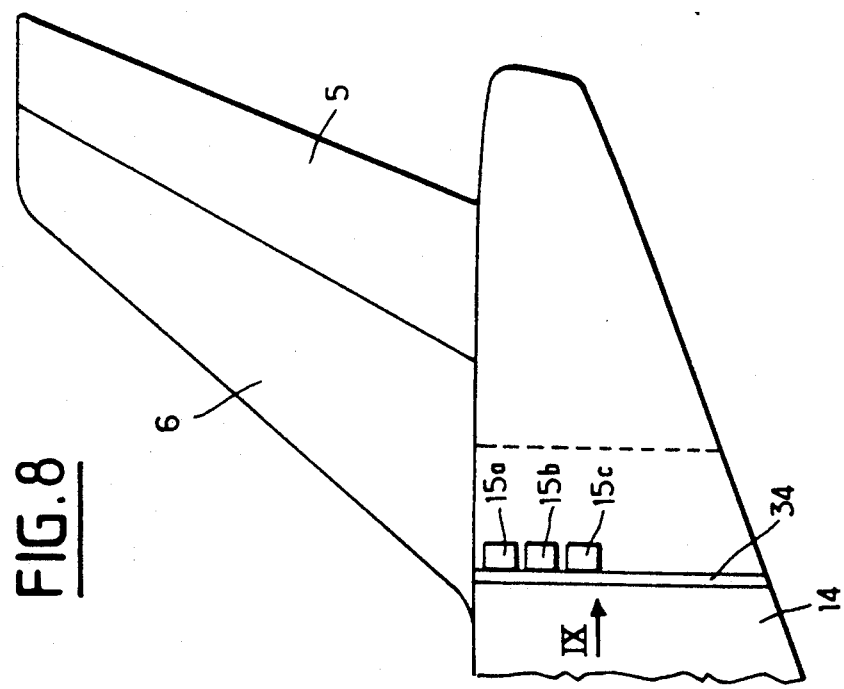
FIG. 8 is a diagram showing how the accelerometers of the system in FIG. 7 may be installed on the airplane.

FIGS. 8 to 10 show how the accelerometers 15a, 15b, and 15c are disposed in the rear portion 14 of the fuselage 2. The accelerometers are fixed one above the other on a frame member 34 of said fuselage via fixing brackets that are close to one another and that are given references 35a, 35b, and 35c, respectively. Thus, said filters 15a, 15b, and 15c measure the same accelerations transversed to the longitudinal axis of the airplane 1 providing there is no twisting of the rear fuselage.

I claim:

1. A system for improving the flutter behavior of an aircraft provided with a fixed wing unit and with a rudder which is actuated by control means receiving a yaw piloting signal, said system comprising:
   an accelerometer disposed in the rear portion of said aircraft to detect accelerations due to alternating lateral bending thereof and to generate a signal representative of said lateral accelerations;
   filter means receiving said signal representative of said lateral accelerations and generating a control correction signal for said rudder, which correction signal depends on the speed of said aircraft and is intended to damp said alternating lateral bending; and
   adder means for adding said correction signal to said piloting signal;
   wherein said filter means comprise:
   a bandpass filter whose passband is centered about the frequency of alternating lateral bending of said rear portion and which receives said signal representative of said lateral accelerations as generated by said accelerometer;
   a phase matching filter which receives the signal from said bandpass filter;
   a variable gain amplifier amplifying the signal from said phase matching filter, the gain of said amplifier being a decreasing function of the air speed of said aircraft; and
   a switch transmitting the signal amplified by said amplifier to said adder means whenever said air speed of the aircraft is greater than a first threshold speed at which there is a danger of aeroelastic coupling occurring between said alternating bending of said rear portion of said aircraft and the first antisymmetrical bending mode of the aircraft wing unit;
   said phase matching filter being such that before passing through said control means for said rudder, said signal amplified by said amplifier is retarded by 90° relative to said signal representative of said lateral accelerations as generated by said accelerometer.

2. A system according to claim 1, wherein the transfer function of said phase matching filter is of the type $(1+c1 \cdot p)/(1+c2 \cdot p)$, where p is the variable of the Laplace transform and c1 and c2 are constants.

3. A system according to claim 1, wherein the transfer function of said bandpass filter is of the following type:

$$\frac{a0 + a1 \cdot p + a2 \cdot p^2 + a3 \cdot p^3 + \ldots + an-1 \cdot p^{n-1}}{b0 + b1 \cdot p + b2 \cdot p^2 + b3 \cdot p^3 + \ldots + bn \cdot p^n}$$

where p is the variable of the Laplace transform and where $a0, a1, \ldots, an-1, b0, b1, \ldots, bn$ are constants.

4. A system according to claim 3, wherein $a0=0$, $b0=1$, $a2=a3= \ldots =an-1=0$, and $b3=b4= \ldots =bn=0$, with $a1=b1$, and $b2=a1^2$.

5. A system according to claim 1, wherein the gain of said amplifier is a decreasing function not only of said air speed, but also of the Mach number and of the lateral acceleration of the rear fuselage of said aircraft.

6. A system according to claim 1, wherein said switch transmits the signal amplified by said amplifier to said adder means when both said air speed and the Mach number of the aircraft are greater respectively than said first threshold speed and a Mach number second threshold speed at which there is a danger of aeroelastic coupling occurring between said alternating bending of said rear portion of said aircraft and the first antisymmetrical bending mode of the wing unit thereof.

7. A system according to claim 1, wherein the accelerometer is of the analog type and wherein an anti-aliasing filter is disposed between said accelerometer and said bandpass filter.

8. A system according to claim 7, wherein an analog-to-digital converter is disposed between said anti-aliasing filter and said bandpass filter.

9. A system according to claim 1, including a plurality of accelerometers in parallel, disposed close to one another in said rear portion of the aircraft and each generating a signal representative of said lateral accelerations, said signals from said accelerometers being applied to a voting circuit whose output is connected to said bandpass filter.

10. A system according to claim 9, wherein said accelerometers are disposed one above the other.

11. A system according to claim 10, wherein a saturation device is provided to limit the amplified signal from said variable gain amplifier.

* * * * *